April 11, 1961 E. F. STOVER 2,978,908
PNEUMATIC MEASURING APPARATUS
Filed Jan. 15, 1958
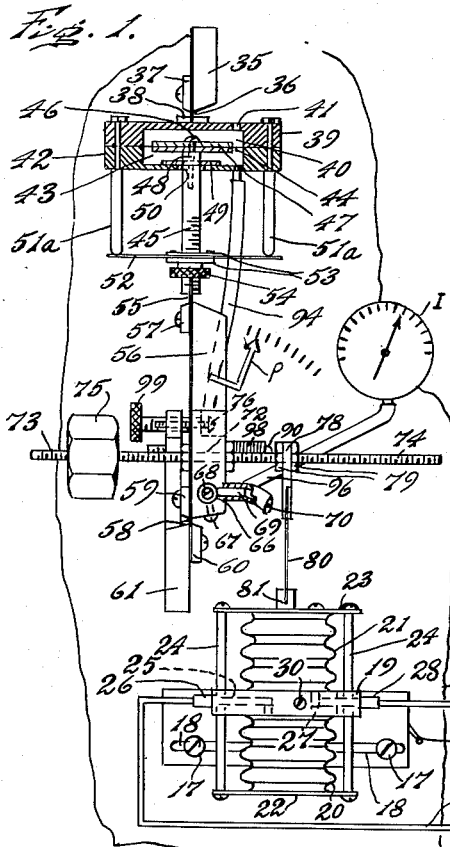
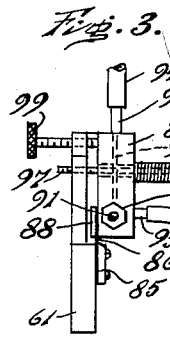
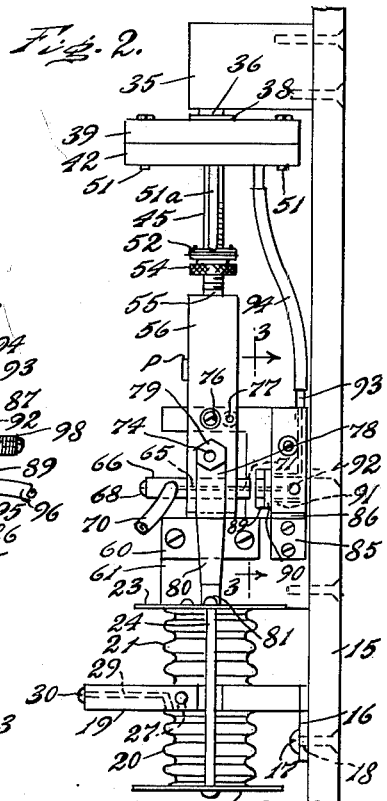
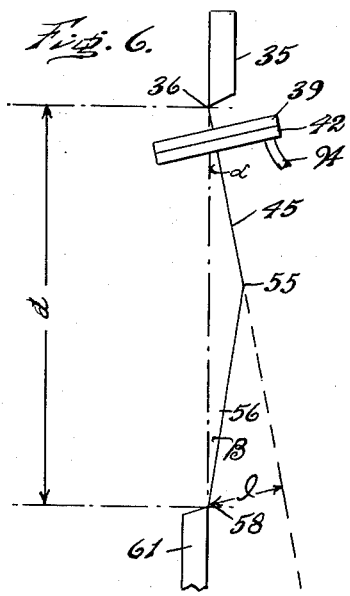
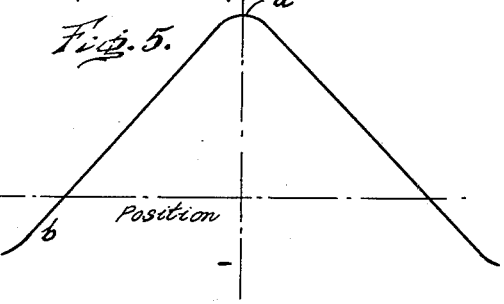
INVENTOR
Emory Frank Stover
BY
ATTORNEY

United States Patent Office 2,978,908
Patented Apr. 11, 1961

2,978,908
PNEUMATIC MEASURING APPARATUS
Emory Frank Stover, 1224 Lafayette Road,
Gladwyne, Pa.
Filed Jan. 15, 1958, Ser. No. 709,012
8 Claims. (Cl. 73—407)

This invention relates to pneumatic measuring apparatus and more particularly to pneumatic apparatus for obtaining a square root relation of a quantity capable of being represented by the magnitude of a force.

It is the principal object of the present invention to provide pneumatic measuring apparatus for directly obtaining a square root relation of a variable, such as a force, differential pressure, or the like.

It is a further object of the present invention to provide pneumatic measuring apparatus for directly obtaining a square root relation of a variable quantity in which the apparatus has a zero adjustment.

It is a further object of the present invention to provide pneumatic measuring apparatus for directly obtaining a square root relation of a variable quantity in which a resilient component is employed which aids in maintaining proper alignment of the parts, compensates for spring stiffness in other resilient components, and permits of selection of the operating range of the scale of measurement of the variable quantity.

It is a further object of the present invention to provide pneumatic measuring apparatus for directly obtaining a square root relation of a variable quantity which is suitable for use in a wide range of applications.

Other objects and advantageous features of the invention will be apparent from the description and claims.

The nature and characteristic features of the invention will be more readily understood from the following description, taken in connection with the accompanying drawings forming part thereof, in which:

Figure 1 is a front elevational view of a preferred form of pneumatic measuring apparatus in accordance with the invention, in a particular application to fluid flow measurement;

Fig. 2 is a side elevational view of the apparatus shown in Fig. 1;

Fig. 3 is a fragmentary sectional view taken approximately on the line 3—3 of Fig. 2;

Figs. 4A and 4B are diagrammatic views, for purposes of illustration, of related orifices or nozzles employed in connection with the invention shown in different operating positions;

Fig. 5 is a chart illustrating the relationships between relative displacement and delivered pressure of orifices or nozzles employed in connection with the invention; and Fig. 6 is a diagrammatic view illustrating the operating relation of component parts of the pneumatic measuring apparatus in accordance with the invention.

It should, of course, be understood that the description and drawings herein are illustrative merely, and that various modifications and changes can be made in the structure disclosed without departing from the spirit of the invention.

Like numerals refer to like parts throughout the several views.

The pneumatic measuring apparatus in accordance with the invention is suitable for use with a primary metering device for obtaining a force derived from a differential pressure attendant on fluid flow through conduits in which venturi tubes, orifices, nozzles or pitot tubes are connected, or from pitot tubes employed for obtaining the speed of ships, aircrafts or the like, when in motion.

Referring now more particularly to Figs. 1, 2 and 3 of the drawings, in which the apparatus of the invention is shown in a specific embodiment of use in connection with fluid flow through conduits, a fluid conduit 10 is illustrated, having an orifice plate 11 therein. The upstream or high pressure side of the orifice plate 11 has a pipe 12 connected thereto and the downstream or low pressure side of the orifice plate 11 has a pipe 13 connected thereto. The pipes 12 and 13 permit of transfer of the differential pressure effective on opposite sides of the orifice plate 11.

A mounting plate 15 is provided, which, for use with the primary metering orifice plate 11 and the pipes 12 and 13 extending therefrom, can have a bracket 16 adjustably secured thereto by screws 17. The screws 17, as shown, extend through elongated slots 18 in the bracket 16 and permit horizontal adjustment of the bracket 16. The bracket 16 has extending horizontally therefrom a bellows mounting plate 19 with opposed flexible metallic bellows 20 and 21 secured thereto in fluid tight relation at their inner ends. The bellows 20 is closed at its outer end in fluid tight relation by an end plate 22 and the bellows 21 is closed at its outer end in fluid tight relation by an end plate 23. The end plates 22 and 23 have spacer rods 24 extending therebetween for connecting them for simultaneous movement of the bellows 20 and 21.

The mounting plate 19 has a passageway 25 therein in communication with the interior of the bellows 20 and with a terminal nipple 26 to which the pipe 12 is connected for applying the upstream pressure within the bellows 20. The mounting plate 19 has a passageway 27 therein in communication with the interior of the bellows 21 and with a terminal nipple 28 to which the pipe 13 is connected for applying the downstream pressure within the bellows 21.

The mounting plate 19 can also be provided with a passageway 29, normally closed by a screw 30, and in communication with the interior of the bellows 20 to provide a blow-off connection for the bellows 20.

The mounting plate 15 has an upper anchor block 35 secured thereto in any desired manner to which a flexible metallic fulcrum strip 36 is secured at one end by a clamping block 37. The other end of the fulcrum strip 36 is secured in any desired manner, such as by soldering, to a block 38 which is in turn secured to an upper diaphragm housing section 39. The housing section 39 has a chamber 40 therein in communication with the atmosphere through a port 41.

A lower diaphragm housing section 42 is provided, axially aligned with the housing section 39, and having a chamber 43 therein, and an interposed flexible diaphragm 44 is clamped between the housing sections 39 and 42 and separates the chambers 40 and 43. A diaphragm rod 45 is provided and is held in assembled relation to the diaphragm 44 by a screw 46 extending thereinto. The screw 46 extends through diaphragm clamping plates 47, a spacer 48 and a thin flexible rubber sealing disc 49 at the opening 50 in the housing section 42 through which the rod 45 extends.

The housing sections 39 and 42 are held in clamped engagement with respect to the diaphragm 44 by screws 51. An opposed pair 51a of the screws 51, in a plane perpendicular to the plane of the fulcrum strip 36, are elongated and bear on a compensating or destabilizing spring 52 in the form of a substantially rectangular strip. The spring 52, at the center thereof, is provided with opposite reinforcing plates 53, riveted or otherwise secured thereto. The spring 52 and plates 53 have a central clearance opening through which the rod 45 extends. The end of the rod 45 is threaded for the reception of a knurled adjusting nut 54 which, by its engagement with the outer of the plates 53, forces the spring 52 against the ends of the screws 51a.

The lower end of the rod 45 has secured thereto in any desired manner, such as by soldering, one end of a flexible metal fulcrum strip 55. The other end of the strip 55 is clamped to the upper end of a control lever 56 by a clamping block 57.

The control lever 56, at the other end has one end of a flexible metal fulcrum strip 58 secured thereto by a clamping block 59, the other end of the fulcrum strip 58 being secured by a clamping block 60 to an anchor block 61 which is in turn secured to the mounting plate 15.

The control lever 56, near the lower end thereof, is provided with a bore 65 within which a cylindrical sleeve 66 is mounted and held in longitudinally axially adjusted position by a screw 67.

The sleeve 66 is closed at its outer end by a screw 68 and is provided with a perpendicularly disposed nipple 69 for the attachment of a flexible hose 70. The hose 70 is connected to any suitable source of fluid under pressure, such as pressure regulated and filtered air. At the inner end of the sleeve 66, a longitudinally axially disposed orifice 71 is provided perpendicular to the end face of the sleeve 66. The shape of the orifice 71 does not seem to be significant and the same results are obtained with orifices of circular cross section and orifices of rectangular cross section. One suitable orifice 71 can be provided by drilling a hole of the order of 0.015 to 0.020 inch in diameter.

The control lever 56 has a tapped hole 72 therein into which threaded rods 73 and 74 are inserted. The rod 73 has threaded thereon an adjustable balance weight 75 for counterbalancing the weight of certain of the parts and to trim the lever 56 at zero setting.

In order to limit the extent of movement of the control lever 56, a stop screw 76 is mounted in the anchor block 61 and extends through an opening on the lever 56 so that the head of the screw 76, dependent upon its setting, limits movement of the lever in one direction and towards the right in Fig. 1.

A screw 77, threaded in the anchor block 61, has its end adjustably positioned for limiting movement in the other direction and towards the left by engagement of the lever 56 therewith.

The rod 74 has slidably mounted thereon a hanger 78 which is held in adjusted position on the rod 74 by nuts 79. The hanger 78 has soldered or otherwise secured thereto one end of a flexible metal fulcrum strip 80, the other end of the strip 80 being secured to a boss 81 mounted on the upper bellows end plate 23.

The anchor block 61 has secured thereto, by a clamping block 85 (see Fig. 3), one end of a flexible metal fulcrum strip 86, the other end of the strip 86 being secured to an adjusting lever 87 by a clamping block 88.

An orifice bushing 89 is provided in threaded engagement in the lever 87 and is sealed by a sealing washer 90. The orifice bushing 89 has an orifice 91 longitudinally axially disposed perpendicular to the outer end face of the bushing 89.

The orifice 91 is similar to the orifice 71, can be of circular cross section, or of rectangular or other cross section, and is preferably a drilled hole of the order of 0.015 to 0.020 inch in diameter. The facing surfaces of the orifice bushing 89 and of the sleeve 66 are parallel and are preferably separated a distance of about 0.003 inch.

The relationship between the size of the surfaces surrounding the orifices 71 and 91, and the diameters of these orifices can be varied, but it has been found that surfaces extending radially outwardly at least five such diameters give satisfactory results.

The interior of the bushing 89 is in communication with a passageway 92 in the lever 87. The passageway 92 has a nipple 93 connected thereto from which a flexible tube 94 extends to and in communication with the chamber 43 below the diaphragm 44. The passageway 92 also has a nipple 95 connected thereto from which a flexible tube 96 extends to a pressure responsive instrument I for indicating and/or recording the pressure delivered thereto and which pressure gives the square root value of the quantity as hereinafter more fully explained.

The lever 87 has a transverse clearance opening therethrough through which a screw 97 extends into threaded engagement in the anchor block 61. A spring 98, surrounding the shank of the screw 97 and bearing against the head thereof urges the lever 87 towards the anchor block 61.

A knurled screw 99, in threaded engagement in the anchor block 61, bears against the opposite side of the lever 87 for adjustably positioning the same against the force of the spring 98 on a fulcrum provided by the strip 86.

The mode of operation will now be pointed out.

The operation of the apparatus herein depends upon the properties displayed by a pair of small orifices such as the orifices 71 and 91 illustrated in two positions in Figs. 4A and 4B, respectively. With the orifice bushings 66 and 89 provided, as herein described, with flat parallel facing surfaces spaced a short distance apart, of the order of three thousandths of an inch, and with air at constant pressure supplied through the supply orifice 71, the delivery orifice 91 will receive an impact pressure nearly equal to the supply pressure (see Fig. 4A). If now the orifices 71 and 91 are displaced relatively, as shown in Fig. 4B, the delivered pressure will decrease in a linear fashion down to a vacuum of two or three pounds per square inch. Over most of the travel, the delivered pressure is a linear function of the relative orifice displacement.

The developed pressure-displacement relationship is illustrated in Fig. 5 in which the displacements are shown as abscissas and the developed pressures as ordinates, the position at "a" corresponding to the matching orifice position of Fig. 4A and the position at "b" corresponding to a displaced position such as in Fig. 4B.

Assume that air under constant pressure is supplied through the tube 70 and to and through the bushing 66 for delivery through the orifice 71.

When the flexible fulcrum strips 36, 55 and 58, are all in alignment the screw 99 can be adjusted to bring the delivery orifice 91 to or near the position of zero delivered pressure.

If a differential pressure from the primary metering device is effective through the pipes 12 and 13 to the interiors of the bellows 20 and 21, a downward force will be exerted on the rod 74, thus tilting the control lever 56 about the fulcrum provided by the fulcrum strip 58, in a clockwise direction. This will increase the delivered pressure in the bushing 89, and this increased pressure is effective through the tube 94 to the chamber 43 beneath the diaphragm 44. At the same time the increased pressure is effective through the tube 96 and at the measuring instrument I. This pressure is proportional to the angle of tilt of the control lever 56.

In Fig. 6, the relationship is shown diagrammatically of the anchor blocks 35 and 61, and control lever 56, the diaphragm rod 45, the diaphragm 44 and the flexible strips 36, 55 and 58.

It will be seen that as the control lever 56 rotates clockwise, the lever arm $l$ of the force transmitted by the diaphragm 44 along the rod 45 increases linearly so long as the angles $\alpha$ and $\beta$ are kept small. The value of the lever arm is equal to the product of the distance $d$ and the sine of the angle $\alpha$. From a table of natural sines it can be seen that the sine of an angle is proportional to the angle to the fourth significant figure up to about 12°.

Accordingly, the pressure effective on the diaphragm 44 is proportional to the angle $\alpha$ and the force resulting from this pressure has a lever arm about the hinge point of the flexible strip 58 which is also proportional to the angle $\alpha$. The product of this force and its lever arm is the counterclockwise moment acting on the control lever 56 in opposition to the clockwise moment of the force from the bellows assembly.

If $q$=the rate of flow through the orifice plate 11
$h$=the differential pressure produced by this flow
$A_1$=the effective area of the bellows 20 and 21
$m$=the lever arm of the bellows force about the hinge point of the strip 58
$F_1$=the force applied to the rod 45 by the bellows 20 and 21
$M_1$=the clockwise moment of the bellows force about the hinge point of the flexible strip 58
$h = K_1 q^2$
$F_1 = A_1 h = A_1 K_1 q^2$
$M_1 = F_1 m = A_1 K_1 q^2 m$
$p$=the delivered pressure acting on the diaphragm 44
$= K_2 \alpha$
$A_2$=the effective area of the diaphragm 44
$l$=the lever arm of the diaphragm force
$= d K_3 \alpha$
$F_2$=the diaphragm force
$M_2$=the counterclockwise moment of the diaphragm force about the hinge point of the flexible strip 58
$F_2 = K_2 \alpha A_2$
$M_2 = F_2 l = K_2 \alpha A_2 l = K_2 K_3 A_2 d \alpha^2$
For equilibrium $M_1 = M_2$
$A_1 K_1 q^2 m = K_2 K_3 A_2 d \alpha^2$
$A_1$, $K_1$, $m$, $K_2$, $K_3$, $A_2$, and $d$ are constants
Therefore $K_4 q^2 = K_5 \alpha^2$ or taking the square root of both sides of this equation:

$$\alpha = K_6 q$$

Since $$p = K_2 \alpha,$$

then $$p = K_2 K_6 q$$

From this it will be seen that either of the angles $\alpha$ or $\beta$, and the delivered pressure, are linear measures of the rate of flow through the orifice plate 11.

A pointer P attached to the control lever 56 and moving over a scale of uniform divisions will show the rate of flow. The pressure indicated at the instrument I, which can have uniform divisions thereon, also shows the rate of flow through the orifice plate 11.

It will be noted that the spring 52 serves a number of purposes.

First, the spring 52 maintains proper alignment of the diaphragm assembly between the flexible strips 36 and 55.

Second, the spring 52, as hereinafter explained, provides a compensating action for the spring stiffness of all the elements which are elastically deformed upon movement occurring upon changes in the rate of flow.

Third, the spring 52 permits the use of some other pressure than atmospheric zero as the starting point of the rate scale. For example, a scale in the range from 3 to 15 pounds per square inch can be employed. By tightening the nut 54 until the control lever 56 is in indifferent equilibrium in any position, when the instrument I shows 3 p.s.i. and the differential pressure in the bellows 20 and 21 is zero, then the readings of delivered pressure at the instrument I will be above this value and linear with respect to the rate of flow.

The action of the spring 52 in providing a compensating or destabilizing effect can be explained as follows. The spring 52 causes the rod 45 to thrust downwardly on the flexible strip 55 and the control lever 56. When the control lever 56 rotates clockwise about the hinge point of the strip 58, the lever arm of the downward force from the spring 52 increases.

Thus, the toggle system made up of all the interconnected parts between the strips 36 and 55, acting as one link, and the control lever 56 acting as the other link is essentially unstable. Tightening the nut 54 and thereby increasing the stress in the spring 52 increases this instability. Since all the other spring elements in the system have a stabilizing effect on the system as a whole, the opposite effect of the spring 52 can be employed to cancel out the combined action of all the other spring elements. The system will then be sensitive only to the effects of the differential pressure in the bellows 20 and 21 and the fluid pressure effective on the diaphragm 44.

I claim:

1. Measuring apparatus comprising a support, a control lever, a resilient hinge connection between said control lever and said support, a rod extending perpendicularly from said control lever, means connected to said rod for applying a variable force on said control lever with a constant lever arm about said support, fluid pressure responsive means having a resilient hinge connection to said support and a resilient hinge connection to said control lever, said hinge connections being disposed for bending in a common plane, said fluid pressure responsive means applying a force on said control lever at a predetermined location in a direction substantially lengthwise of said control lever with a moment arm about said support increasing linearly with the motion of said control lever and in opposition to the force applied by said first force applying means, and means for determining the force applied by said fluid pressure responsive means as a linear function of the motion of said lever comprising a device carried by said control lever and having an exterior surface portion with an orifice terminating at said surface portion, and a fixedly mounted member on said support having an exterior surface portion in closely spaced relation to said first mentioned surface portion with an orifice terminating at said second mentioned surface portion and capable of delivering fluid pressures at or below atmospheric zero, a fluid pressure supply connection in communication with one of said orifices for the delivery of fluid therethrough, and a fluid delivery connection in communication with the other of said orifices and said fluid pressure responsive means for delivery thereto of pressure fluid picked up by said other orifice from said one orifice.

2. Measuring apparatus comprising a support, a control lever, a resilient hinge connection between said control lever and said support, a rod extending perpendicularly from said control lever, means connected to said rod for applying a variable force on said control lever with a constant lever arm about said support, fluid pressure responsive means having a resilient hinge connection to said support and a resilient hinge connection to said control lever, said hinge connections being disposed for bending in a common plane, said fluid pressure responsive means applying a force on said control lever at a predetermined location in a direction substantially lengthwise of said control lever with a moment arm about said support increasing linearly with the motion of said control lever and in opposition to the force applied by said first force applying means, a resilient adjusting member for said fluid pressure responsive means, and means for determining the force applied by said fluid pressure responsive means as a linear function of the motion of said lever comprising a device carried by said control lever and having an exterior surface portion with an orifice terminating at said surface portion, and a fixedly mounted member on said support having an exterior surface portion in closely spaced relation to said first mentioned surface portion with an orifice terminating at said second mentioned surface portion and capable of delivering fluid pressures above, at or below atmospheric zero, a fluid pressure supply connection in communication with one of said orifices for the delivery of pressure fluid therethrough, and a fluid delivery connection in communication with the other of said orifices and said fluid pressure responsive means for delivery thereto of pressure fluid picked up by said other orifice from said one orifice.

3. Measuring apparatus comprising a support, a control lever, a resilient hinge connection between said control lever and said support, a rod extending perpendicularly from said control lever, means connected to said rod for applying a variable force on said control lever with a constant lever arm about said support, fluid pressure responsive means having a resilient hinge connection to said support and a resilient hinge connection to said control lever, said hinge connections being disposed for bending in a common plane, said fluid pressure responsive means applying a force on said control lever at a predetermined location in a direction substantially lengthwise of said control lever with a moment arm about said support increasing linearly with the motion of said control lever and in opposition to the force applied by said first force applying means, and means for determining the force applied by said fluid pressure responsive means as a linear function of the motion of said lever comprising a device carried by said control lever and having an exterior surface portion with an orifice terminating at said surface portion, and a fixedly mounted member on said support having an exterior surface portion in closely spaced relation to said first mentioned surface portion with an orifice terminating at said second mentioned surface portion and capable of delivering fluid pressures above, at or below atmospheric zero, a fluid pressure supply connection in communication with one of said orifices for the delivery of fluid therethrough and a fluid delivery connection in communication with the other of said orifices and said fluid pressure responsive means for delivery thereto of pressure picked up by said other orifice from said one orifice, and a fluid pressure responsive member connected to said delivery connection for indicating a square root value of said variable force.

4. Measuring apparatus comprising a support, a control lever, a resilient hinge connection between said control lever and said support, a rod extending perpendicularly from said control lever, means connected to said rod for applying a variable force on said control lever with a constant lever arm above said support, fluid pressure responsive means having a resilient hinge connection to said support and a resilient hinge connection to said control lever, said hinge connections being disposed for bending in a common plane, said fluid pressure responsive means applying a force on said control lever at a predetermined location in a direction substantially lengthwise of said control lever with a moment arm about said support increasing linearly with the motion of said control lever and in opposition to the force applied by said first force applying means, a member for adjusting said fluid pressure responsive means for change of range of response thereof, and means for determining the force applied by said fluid pressure responsive means as a linear function of the motion of said lever comprising a device carried by said control lever and having an exterior surface portion with an orifice terminating at said surface portion, and a fixedly mounted member on said support having an exterior surface portion in closely spaced relation to said first mentioned surface portion with an orifice terminating at said second mentioned surface portion and capable of delivering fluid pressures above, at or below atmospheric zero, a fluid pressure supply connection in communication with one of said orifices for the delivery of fluid pressure therethrough, and a fluid delivery connection in communication with the other of said orifices and said fluid pressure responsive means for delivery thereto of pressure fluid picked up by said other orifice from said one orifice.

5. Measuring apparatus as defined in claim 4 in which said last mentioned fluid delivery connection has an instrument connection in communication therewith and a pressure responsive instrument is provided to which said instrument connection is connected.

6. Measuring apparatus comprising a support, a control lever, a resilient hinge connection between said control lever and said support, a rod extending perpendicularly from said control lever, means connected to said rod for applying a variable force on said control lever with a constant lever arm about said support, resilient fluid pressure responsive means having a resilient hinge connection to said support and a resilient hinge connection to said control lever, said hinge connections being disposed for bending in a common plane, said fluid pressure responsive means applying a force on said control lever at a predetermined location in a direction substantially lengthwise of said control lever with a moment arm about said support increasing linearly with the motion of said control lever and in opposition to the force applied by said first force applying means, said hinge connections being initially in alignment, means for determining the force applied by said fluid pressure responsive means as a linear function of the motion of said lever comprising a device carried by said control lever and having an exterior surface portion with an orifice terminating at said surface portion, and a fixedly mounted member on said support having an exterior surface portion in closely spaced relation to said first mentioned surface portion with an orifice terminating at said second mentioned surface portion and capable of delivering fluid pressures above, at or below atmospheric zero, a fluid pressure supply connection in communication with one of said orifices for the delivery of fluid therethrough and a fluid delivery connection in communication with the other of said orifices and said fluid pressure responsive means for delivery thereto of pressure picked up by said other orifice from said one orifice, and members for applying a destabilizing force on said fluid pressure responsive means compensatory to the forces applied by said resilient hinge connections and said resilient fluid pressure responsive means.

7. Measuring apparatus as defined in claim 6 in which said destablizing force applying members are interposed between the fluid pressure responsive means and the third mentioned resilient hinge connection and include a biasing spring urging said pressure responsive means in a predetermined direction.

8. Measuring apparatus as defined in claim 6 in which said destabilizing force applying members are interposed between the fluid pressure responsive means and the third mentioned resilient hinge connection and include a pair of spaced arms extending from said pressure responsive means, and an adjustable resilient member engaging the ends of said arms for varying the force effective at said fluid pressure responsive means.

References Cited in the file of this patent

UNITED STATES PATENTS

| | | |
|---|---|---|
| 1,558,530 | Wunsch | Oct. 27, 1925 |
| 2,190,506 | Wurr | Feb. 13, 1940 |
| 2,408,685 | Rosenberger | Oct. 1, 1946 |
| 2,509,078 | Stover | May 23, 1950 |
| 2,658,392 | Vannah | Nov. 10, 1953 |
| 2,887,881 | Jones | May 26, 1959 |